Patented Aug. 1, 1933

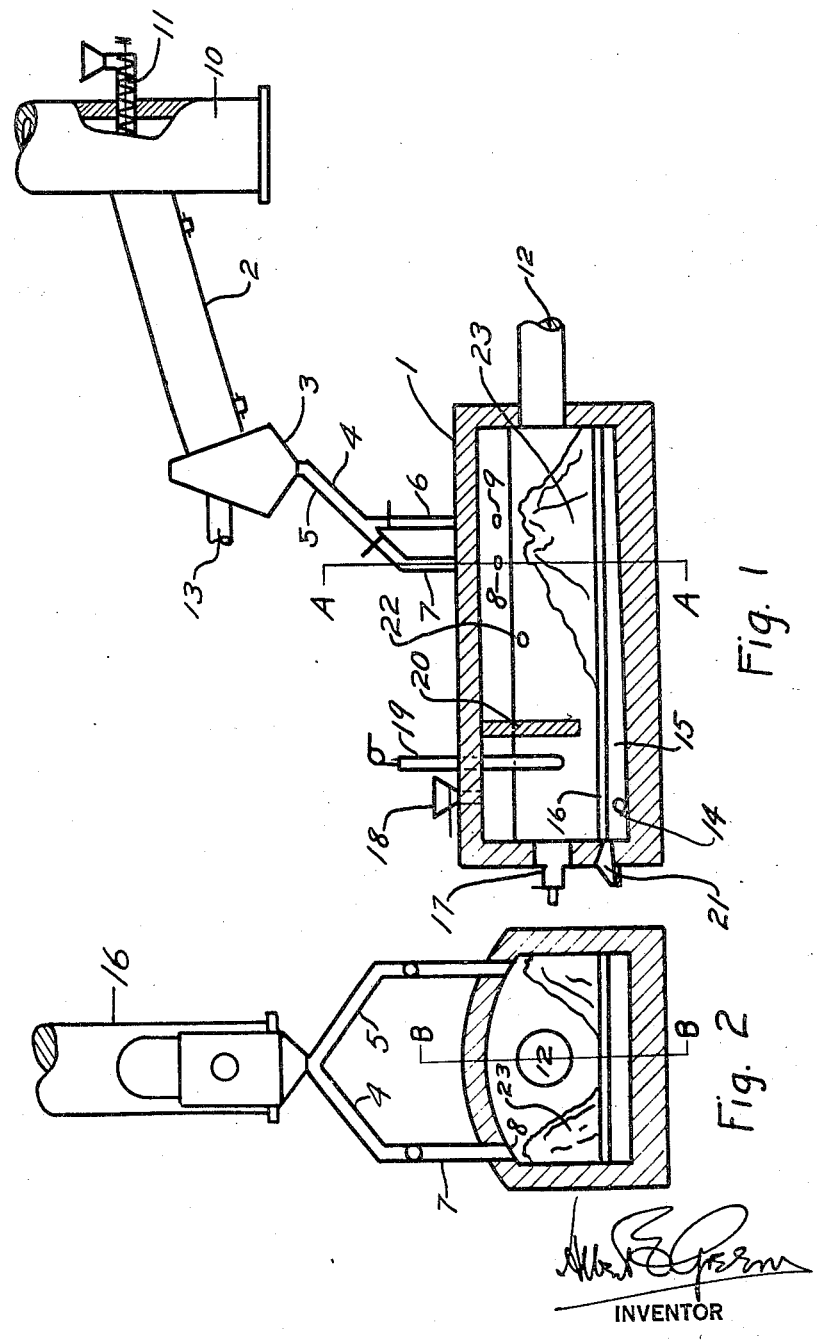

1,920,377

UNITED STATES PATENT OFFICE 1,920,377

SELECTIVE REDUCTION

Albert E. Greene, Medina, Wash.

Application July 16, 1931, Serial No. 551,180, and in Canada June 18, 1925

4 Claims. (Cl. 75—22.5)

I have filed application in Canada, Serial No. 303,820, filed June 18, 1925.

My present invention relates to metallurgical processes for the reduction of oxide ores, and particularly to an improved method of selectively reducing one or more metal oxides contained in ore. My process relates further to a process of reduction at controlled relatively low temperatures whereby iron is reduced from an iron ore containing phosphorus without reduction of the phosphorus.

One object of my invention is to treat high phosphorus iron ore in order to reduce the iron therefrom in a continuous manner while retaining the phosphorus in the slag in chemical combination with certain slag forming oxides, namely calcium oxide and iron oxide. Another object of my invention is to control the reduction of iron oxide so as to only partly reduce it, whereby some of the oxide is retained in the slag where it serves to hold the phosphorus oxide in combination with calcium oxide so that the phosphorus is not reduced.

This application contains subject matter in common with my applications for patent, Serial No. 726,541, filed July 17, 1924 (United States Patent No. 1,819,238) and Serial No. 34,041 filed June 1, 1925 (United States Patent No. 1,819,239).

The process of this invention consists in preparing a mixture of oxide ore with calcium oxide or lime stone and also with carbonaceous reducing agent, such as coal, preferably all crushed relatively fine. This prepared mixture is fed into a smelting hearth furnace so that it moves on to a molten slag bath therein. The mixture may be preheated, or it may even be partly reduced at temperatures below the sintering temperature before it is fed into the smelting hearth furnace. The smelting furnace is provided with heating means such as electric heating means with or without fuel heating means. A bath of molten slag and reduced metal beneath is maintained. The prepared mixture, after it enters the smelting chamber, is heated to a temperature sufficiently high to cause reduction of the oxide of iron but not sufficiently high to fuse the reduced pure iron. Reduction results from the action of the carbonaceous material. The mixture is preferably charged at one part or end of the smelting hearth where it can be heated to the reducing temperature and then as reduction proceeds the mixture moves along on the slag bath and the reduced iron passes down beneath the slag. At the other part of the bath heating may be increased so as to readily fuse the slag forming materials. The proportion of carbonaceous material is regulated in accordance with the temperature and proportion of oxygen in the atmosphere in the part of the smelting hearth where the charge enters. It is regulated so as to not completely reduce the oxide of iron in the slag after the slag forming materials have become fused. In this molten slag, it is desirable to maintain at least 10% and preferably from 15% to 25% of oxide of iron and the slag will also contain lime in sufficient amount to hold the phosphorus oxide combined with the lime and iron oxide. The regulation of the proportion of carbonaceous material is governed by the extent to which combustion takes place in the smelting hearth. A considerable excess of carbon may be present in the charge entering the smelting hearth chamber and yet not prevent the retaining of oxide of iron in the slag formed. That is, oxidation in the smelting chamber may dispose of this excess of carbon and by this means together with the control of temperature the iron oxide is not completely reduced and sufficient is left to accomplish the holding of the phosphorus oxide from reduction.

I have carried out the process of this invention in two different ways,—in one, the iron oxide retained in the molten slag served to take up practically all of the carbon so that the reduced iron was practically free of carbon, and in the other, the reduced iron contained carbon but the temperature was such as to retain the phosphorus in the slag even in the presence of the carbonized iron. In the first mentioned kind of operation I have collected the reduced iron in very pure condition beneath the slag where it collected and remained in a semi-molten or solid condition. In the second kind of operation where the reduced iron contains a considerable amount of carbon, its melting point is lowered and it remained molten beneath the slag.

My method may be carried out continuously by means of a continuous or regular feed of charge mixture and a tapping of slag at regular intervals. The reduced iron collects beneath the slag and can be tapped after it is raised in temperature sufficiently. However, when pure iron collects beneath the slag, the feed can be stopped and a reducing slag substituted for the oxide slag, and the metal can be finished under this reducing slag without contamination.

Another feature of the process of my invention relates to sulphur removal from the reduced metal, or rather to separation of sulphur which may be present in the charge. I have found that under the conditions of operation with a basic slag and the conditions described in the operation of this process, sulphur is largely separated from the reduced iron. I have found that coal may be used even though it contains a considerable amount of sulphur and yet the reduced iron can be made practically free from sulphur. My process is thus applicable for the treatment of ore and use of carbonaceous material containing sulphur for the production of low sulphur iron.

My invention may be carried out in different types of furnaces but I have found the kind of apparatus illustrated in the annexed drawing satisfactory for the purpose.

In the annexed drawing,

Fig. 1 is an elevation partly in section, of apparatus which may be employed for carrying out the process of the invention; and Fig. 2 is a sectional elevation taken substantially along line A—A of Fig. 1.

The apparatus shown in the drawing comprises a smelting hearth chamber 1 and a rotary preheating furnace 2 which communicates with a feed head 3. A plurality of charge pipes 4, 5, 6 and 7 extend between the feed head 3 and openings in the chamber roof, indicated by the numerals 8 and 9, and provide means for conducting charge material from the feed head to the interior of the chamber. A stack 10 carries the flue gases away. Through this stack a screw conveyor 11 serves to carry the charge mixture into the upper end of the rotary kiln 2. A flue opening 12 is provided in the end of the smelting chamber for exit of gas. An opening is provided in the feed head for a pipe 13 which may be extended to communicate with the interior of the smelting chamber to provide means for conducting hot reducing gas from the smelting chamber into the feed head. Gas thus introduced into the feed head may be mixed with air and burned in the lower end of the rotary kiln. The hearth of the smelting chamber slopes toward the tapping end. The tap hole 14 for metal is located adjacent the lowermost end of the hearth. Metal and slag on the hearth of the smelting chamber are indicated by the numerals 15 and 16, respectively.

A burner 17 which may serve for admission of fuel and air when needed is provided adjacent the tapping end of the smelting chamber. An opening 18 through the roof serves for admission of carbonaceous material and other material. An electrode is shown at 19 and two others may be provided in the same line across the furnace for use of three phase current. A refractory wall, indicated in dotted lines at 20, having its bottom edge spaced above the hearth of the smelting chamber may be provided adjacent the electrodes and between the electrodes and the charging end of the smelting chamber. The provision of a wall such as that indicated by the numeral 20 results in the establishment of separate chambers in which different temperatures may be established through the use of similar or different types of heating means and/or in which different types of atmospheres may be maintained.

A slag tapping spout 21 is provided. An air inlet 22 serves for admission of air in controlled amounts for combustion in the charging end portion of the furnace chamber.

Other types of furnaces such, for example, as simple electric furnaces may be employed in carrying out the process of the invention, but I prefer to use an elongated furnace in order to provide for heating of the charge in a pile at the charging end at a relatively low temperature and subsequent melting of the charge and completion of the operation under the influence of electric heat at the tapping end. Where the continuous operation is carried on for a time and then the reduced metal finished under a special slag, it is desirable to use a furnace which may be heated entirely by means of electric heat.

To illustrate the process of the invention, the treatment of an ore containing approximately 83% of oxide of iron, 12% of silica, and .6% phosphorus and .75% metallic manganese will be described. The ore is crushed and preferably ground finely and mixed with ground or crushed coal. In addition, limestone of about the same degree of fineness is provided, although a coarser size limestone will serve. In place of limestone, burnt lime could be used, but the excess heat of the process will make it more economical to use limestone.

The proportions of these above mentioned constituents is determined by the subsequent operations. The proportions are so regulated as to maintain a slag containing preferably between 15% and 25% of oxide of iron and 55 to 60 percent of calcium oxide. The amount of coal or carbonaceous material in the original charge may be varied somewhat, but an amount in excess of that required for reducing the iron oxide of the ore should be provided, as a portion of the total amount will be consumed by the oxygen of air which enters the furnace chamber. As long as the slag is maintained within the desired limits so that it will hold the phosphorus from reduction, then the more carbon the better for preliminary reduction. The excess of carbon is maintained not greatly in excess of that actually used to reduce the oxide however.

The coal used may contain sulphur without this entering into the reduced iron which collects beneath the slag. This slag is preferably basic or at any rate contains a considerable proportion of lime, which may account for the fact that the iron can be reduced free or practically free from sulphur.

The process is continuous in which case the prepared charge is fed regularly into the charging end of the smelting chamber and collects in a pile on the hearth where it gradually reduces and then passes along toward the hotter end of the furnace where the arcs control the temperature.

The slag is melted by the time it reaches the slag end. Air can be admitted through the inlet pipes provided for the purpose so as to carry on combustion towards the charging end. This can be done without serious loss of electrode material since the combustion takes place away from the electrodes.

Reduction of iron oxide takes place within the pile at the charging end of the furnace at relatively low temperatures. The temperature of the charge here is well below the fusion temperature of pure iron. The reduced iron collects in particles or globules and passes down through the layer of slag containing some iron oxide and thence into the bath beneath the slag. The slag composition prevents reduction of phosphorus and also removes carbon from the reduced metal.

If the process is carried out so as to collect very pure iron beneath the slag, the iron may freeze. When sufficient iron has collected, the feed of charge may be stopped and the slag replaced by a lime-silica slag under which the pure metal may be superheated for pouring. In this way I have made iron of approximately 99.90% purity, which contained no single impurity in an amount exceeding .02%. That is the phosphorus, carbon, sulphur, silicon, and manganese were none of them in excess of .02% each.

Iron can be reduced containing carbon but with the silicon held below 1% by means of a lime containing slag and a small amount of oxide of iron therein.

What I claim is:

1. The method of treating an iron ore containing phosphorus to reduce the iron and separate it from the phosphorus, said method comprising preparing a charge of crushed ore, carbonaceous material and calcium oxide material in proportions to not completely reduce the iron oxide and to form a slag containing at least ten percent of iron oxide and over fifty percent of calcium oxide, passing this charge into a smelting hearth chamber and heating it on a bath of molten slag therein to a temperature sufficient to reduce the oxide of iron but insufficient to reduce the phosphorus or fuse the charge, and subsequently fusing the slag forming materials and collecting the reduced iron beneath the slag.

2. The method of reducing iron ore and separating the reduced iron from phosphorus and sulphur contained in the charge materials, said method consisting in preparing a mixture of crushed ore, carbonaceous material and calcium oxide material, charging this into a smelting chamber on a molten bath therein and heating it to a temperature sufficiently high to reduce iron oxide but not high enough to fuse the charge, maintaining an oxidizing slag on the bath and a basic flux therein in proportions to hold phosphorus and to prevent reduction of sulphur into the metal, and after reducing the oxide of iron melting the remaining slag material electrically, and collecting the reduced iron beneath the slag.

3. The method of selectively reducing a metal from ore containing an oxide of the metal without reducing another element contained in the ore, the method consisting in preparing a charge of the ground ore, carbonaceous reducing agent and a flux for the oxide of the element to be retained unreduced, regulating the proportion of fluxing agent so as to form a basic slag with the oxide to be held in the slag, placing the mixture on a molten bath in a smelting chamber and heating to a temperature sufficiently high to reduce the metal oxide but not sufficient to melt the pure metal to be reduced, and subsequently melting the slag materials and collecting the reduced metal beneath.

4. The process of reducing oxide of iron and separating the iron from phosphorus contained in the ore, said process consisting in preparing a charge of crushed ore, carbonaceous material and calcium oxide, passing this into a reducing and smelting chamber in a pile above a molten bath of slag, controlling the proportion of carbonaceous material in the entering charge so as to maintain more than 10% of oxide of iron in the resulting slag, heating the charge above the bath in a pile to a temperature sufficiently high to reduce oxide of iron without reduction of phosphorus or fusion of the charge and forming slag of the phosphorus in combination with unreduced oxide of iron and lime, and after reducing oxide of iron melting the slag and collecting the reduced iron beneath.

ALBERT E. GREENE.